(12) United States Patent
Mawji et al.

(10) Patent No.: US 11,059,714 B2
(45) Date of Patent: Jul. 13, 2021

(54) METHOD AND APPARATUS FOR AUTONOMOUS FUELING OF MULTIPLE FUEL TANKS

(71) Applicants: Aleem Mawji, Greenwich, CT (US);
William Castle, Wellesley, MA (US);
Christopher Ohl, Greenwich, CT (US);
Andrew Maude, Key West, FL (US)

(72) Inventors: Aleem Mawji, Greenwich, CT (US);
William Castle, Wellesley, MA (US);
Christopher Ohl, Greenwich, CT (US);
Andrew Maude, Key West, FL (US)

(*) Notice: Subject to any disclaimer, the term of this patent is extended or adjusted under 35 U.S.C. 154(b) by 0 days.

(21) Appl. No.: 16/042,893

(22) Filed: Jul. 23, 2018

(65) Prior Publication Data
US 2020/0024121 A1    Jan. 23, 2020

(51) Int. Cl.
| | |
|---|---|
| *B67D 7/04* | (2010.01) |
| *B67D 7/36* | (2010.01) |
| *B67D 7/38* | (2010.01) |
| *B67D 7/62* | (2010.01) |
| *B67D 7/70* | (2010.01) |
| *B67D 7/78* | (2010.01) |
| *G05D 9/00* | (2006.01) |

(52) U.S. Cl.
CPC .............. *B67D 7/04* (2013.01); *B67D 7/362* (2013.01); *B67D 7/38* (2013.01); *B67D 7/62* (2013.01); *B67D 7/70* (2013.01); *B67D 7/78* (2013.01); *G05D 9/00* (2013.01)

(58) Field of Classification Search
CPC ... B67D 7/04; B67D 7/36; B67D 7/38; B67D 7/62; B67D 7/70; B67D 7/78; B67D 7/362; G05D 9/00; B65B 2039/009; B67C 3/225

USPC .......................................................... 141/244
See application file for complete search history.

(56) References Cited

U.S. PATENT DOCUMENTS

| | | | | |
|---|---|---|---|---|
| 4,551,255 A | * | 11/1985 | Miller ................... | B01D 33/04 210/770 |
| 4,718,452 A | * | 1/1988 | Maitland ................ | F03B 13/00 137/587 |
| 5,573,066 A | * | 11/1996 | Vaillancourt ........... | B67D 7/84 169/49 |
| 6,691,061 B1 | * | 2/2004 | Rogers ................ | G01F 23/0069 702/156 |

(Continued)

FOREIGN PATENT DOCUMENTS

WO    WO-2012172286 A1 * 12/2012 ........... B01D 35/005

*Primary Examiner* — Timothy P. Kelly
*Assistant Examiner* — Stephanie A Shrieves

(57) ABSTRACT

Method and apparatus for autonomously fueling machinery operating at fracking sites. Apparatus includes a main tank with a plurality of fuel lines individually coupled to the fuel tank. Pumps are connected to some of the fuel lines. Pump outputs are coupled to hoses extending to the machinery tanks to be refueled. The apparatus further includes a cap detachably connected to the hoses and machinery tanks. The fuel tank includes an intake filter capable of blocking approximately 10 micron contaminants with about 250 gallon per minute flow. The methodology of the present invention includes measuring the duration of machinery tank fuelings and the interval between fuelings. A first alarm is generated if the duration of fuelings is longer than a first interval. A second alarm is generated if the interval between fuelings is longer than a second interval.

6 Claims, 5 Drawing Sheets

(56) References Cited

U.S. PATENT DOCUMENTS

| | | | | |
|---|---|---|---|---|
| 7,721,751 | B1* | 5/2010 | Perrien | B67D 7/78 |
| | | | | 137/234.6 |
| 9,346,662 | B2* | 5/2016 | Van Vliet | B67D 7/04 |
| 9,725,295 | B2* | 8/2017 | McKay | B67D 7/3209 |
| 9,815,683 | B1* | 11/2017 | Kalala | B67D 7/362 |
| 2004/0007286 | A1* | 1/2004 | Kamikozuru | F17C 5/02 |
| | | | | 141/231 |
| 2014/0360625 | A1* | 12/2014 | Williamson | B67D 7/362 |
| | | | | 141/94 |
| 2017/0009905 | A1* | 1/2017 | Arnold | B67D 7/04 |
| 2018/0101184 | A1* | 4/2018 | Shock | G01S 7/003 |
| 2019/0337795 | A1* | 11/2019 | Shock | B67D 7/78 |
| 2019/0351267 | A1* | 11/2019 | Gantos | G08B 21/182 |

* cited by examiner

METHOD AND APPARATUS FOR AUTONOMOUS FUELING OF MULTIPLE FUEL TANKS

BACKGROUND OF THE INVENTION

There are a variety of venues in which multiple independently fueled machines are in operation and in need of periodic refueling. One such venue is the site of fracking operations. The process of fracking uses a lot of machinery for various operations such as the blending of water, sand and other fluids to form a fracking slurry that is then injected down a well, sometimes more than a mile deep for the purpose of fracturing a layer of sedimentary stone containing the oil to be recovered. To open fractures in this stone, down-well pressures can exceed 10,000 psi in certain cases. Typically, anywhere from 15 to 25 independent diesel-powered machines are used to blend and then pump into the ground the fluid slurries used in fracking. Each of these independent diesel-powered machines will typically have its own dedicated fuel tank (sometimes called a "target tank or a "saddle tank") to provide the machinery with fuel, but such saddle tanks will normally have to be refilled repeatedly during the course of a fracking operation. Fracking operations typically last for several days and, in some instances, the demand for diesel fuel by some of the fracking machinery may necessitate their fuel tank being refueled more than once in a single day.

Refueling operations at a fracking site is an essential and time critical operation. Fracking operations are typically time sensitive. That is, once initiated fracking operations must be carried out to completion. The ability of a well undergoing fracking to subsequently supply oil or and/or natural gas will normally be damaged, or may even be destroyed, if an interruption of the fracking operation occurs because, for example, one or more of the machines operating at the fracking site ceases operation because, it ran out of fuel.

Refueling operations are traditionally performed manually with an independent refueling vehicle parking proximate the machinery to be refueled and an operator dispensing fuel into the machinery saddle tank in much the same way an average person fills the gas tank of their automobile. Fracking sites, however, are often hazardous, busy sites where operators are in close proximity to other operators, chemicals, and heavy machinery, often operating at high pressure. Fuel operators spending extended periods of time filling saddle tanks in the hot zone are at risk of injury and there exists an increased risk of fire if there is fuel spillage.

Accordingly, there exists a need for methods and apparatus to refuel the numerous machinery saddle tanks located at various venues and operations, such as active fracking sites, that obviate the necessity of manual refueling. U.S. Pat. No. 9,346,662 discloses one such fuel delivery method and apparatus. The method and apparatus disclosed in this patent, however, still requires the presence of an on-site operator and suffers from various other deficiencies. The present invention fulfills the above need while further eliminating these deficiencies.

SUMMARY OF THE INVENTION

It is an object of the present invention to provide a method and apparatus for autonomous fueling of multiple machines at an operational site, such as a fracking site, which may comprise a harsh and hostile environment. It is a further object of the present invention to provide an autonomous fueling system capable of operating continuously for the duration of operations, such as fracking operations, with uninterrupted service, even during refueling of the autonomous system itself. A still further object of the present invention is to reduce various single fault "point-of-failure" weaknesses found in prior art systems. It is yet another object of the methodology of the present invention to enhance reliability and continuity of fueling operations, including fuel level and fuel flow monitoring for both source and individual recipient saddle tanks subject to fueling/refueling. Another object of the current invention is to afford rapid and easy customization of the autonomous fueling system of the present invention and easy replacement of failed or damaged components.

These, and other objects and advantages of the present invention are achieved by providing an autonomous fueling system for fueling multiple saddle tanks including a main fuel tank, a support frame adapted to support the main fuel tank upon the ground, a plurality of fuel intake lines projecting into the main fuel tank, a plurality of fuel pumps, at least some of said fuel pumps having an input end attached to at least some of the plurality of fuel intake lines, a plurality of fuel hoses having one end attached to an output end of at least some of said fuel pumps. The autonomous fueling system further includes a fuel cap adapted for mounting on at least some of said multiple fuel tanks, said fuel cap further comprising a fluid flow valve, attached to the fuel cap, configured for preventing fluid flow through the fuel cap absent sufficient fluid input pressure, a self-powered fuel level sensor for sensing a fuel level within a target fuel tank, a gas vent and a fluid flow sensor attached to the gas vent for sensing fluid flow through the gas vent, a wireless transmitter electrically connected to the fuel level sensor and the fluid flow sensor configured to generate a first signal indicative of an output from said fuel level sensor and to generate a second signal indicative of an output from said fluid flow sensor. The autonomous system further includes a power supply, electrically connected to at least some of said fuel pumps, selectively powering said fuel pumps, and a main controller, responsive to the wireless signal from said wireless transmitter, to cause activation of a fuel pump connected to a target fuel tank when said target fuel tank is reduced to a first fuel quantity and to deactivate the fuel pump when target fuel tank is refueled to a second fuel quantity. The controller further recording an interval between target fuel tank refuelings and a duration of target fuel tank refuelings and generating a first alarm signal when an interval between refuelings of a saddle tank exceeds a predetermined time longer than an average of said interval between refuelings and further generating a second alarm signal when a duration of a refueling of a saddle tank exceeds a predetermined time longer than an average of said duration of refuelings.

The method of the present invention includes the steps of measuring a fluid level of at least some of the target fuel tanks, initiating refueling when the saddle tanks are at approximately ⅓ to 40% of maximum capacity, ending refueling when the targets are at approximately ⅔ to 60% full. In an alternative embodiment refueling is initiated when the saddle tanks are at approximately ⅔ of maximum capacity and refueling is ended when approximately 20% of maximum capacity of fuel has been supplied. A further aspect of the methodology of the present invention includes the steps of measuring an interval between refuelings and generating an alarm when a measured interval exceeds an average of the intervals between refuelings by a predetermined amount. A still further aspect of the methodology of the present invention includes the steps of measuring a duration of refuelings and generating a second alarm signal when a measured duration of refueling exceeds an average of the duration of refuelings by a predetermined amount. These, and other aspects of the invention are detailed in the claims which are incorporated herein by reference.

DETAILED DESCRIPTION OF THE INVENTION

Figure 1:
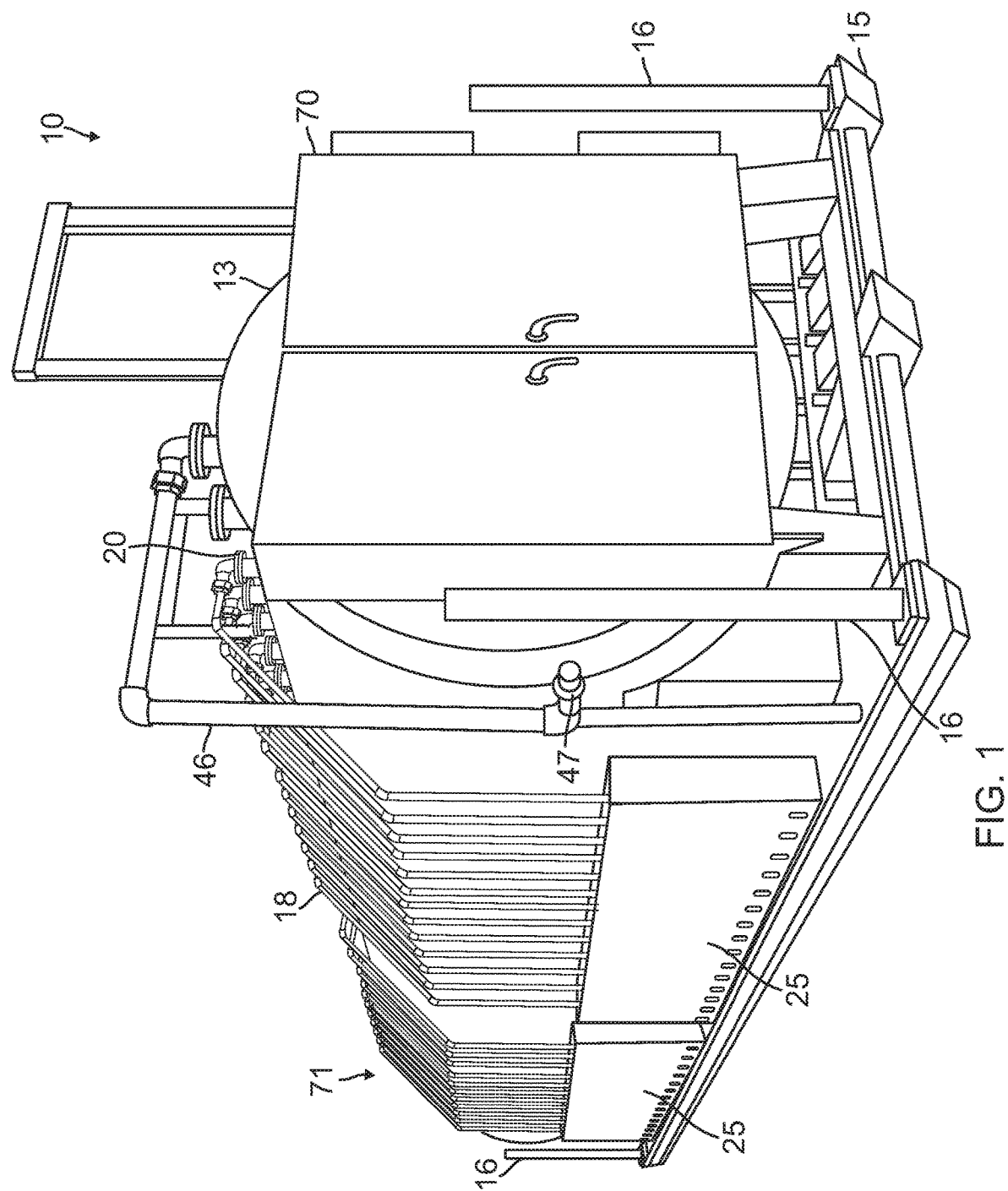
FIG. 1 is a perspective view of one embodiment the autonomous fueling system of the present invention.

Referring to the figures, and more particularly to FIG. 1, there is shown a perspective view of one embodiment 10 of the present invention. In general overview, and as illustrated in FIG. 1, this embodiment of the autonomous fueler of the present invention includes a main fuel tank 13 mounted on a protective support frame 15 generally enclosing the main fuel tank 13 in at least a horizontal plane. The support frame 15 may include bollards 16 to further protect the main fuel tank 13 from inadvertent collision of mobile equipment at an operational fuel supply site, such as an active fracking site. A plurality of fuel intake lines, of which intake line 18 is an example, are mounted on a side of the main fuel tank 13 and preferably descent into the main fuel tank 13 through a plurality of fuel intake couplings, of which fuel intake coupling 20 is an example, at the top of the main fuel tank 13. Applicants have determined attachment of the fuel lines 18 to the top of the tank is preferable to attachment elsewhere, such as at the bottom of the main fuel tank 13 in order to avoid potential fuel leakage issues from the main fuel tank 13 if one of the fuel pumps P1-P25 is being replaced of if one of the fuel intake lines 18 suffers damage at the operational site. In preferred embodiments of the present invention more fuel intake lines 18 are provided than are anticipated to be used at an average operational site, such as a frack site. When used at a frack site it is common for as many as 20 different operational machines to require refueling during performance of the frack. In one preferred embodiment of the present invention intended for use at such a frack site up to 30 fuel intake lines such as line 18 are provided.

Figure 2:
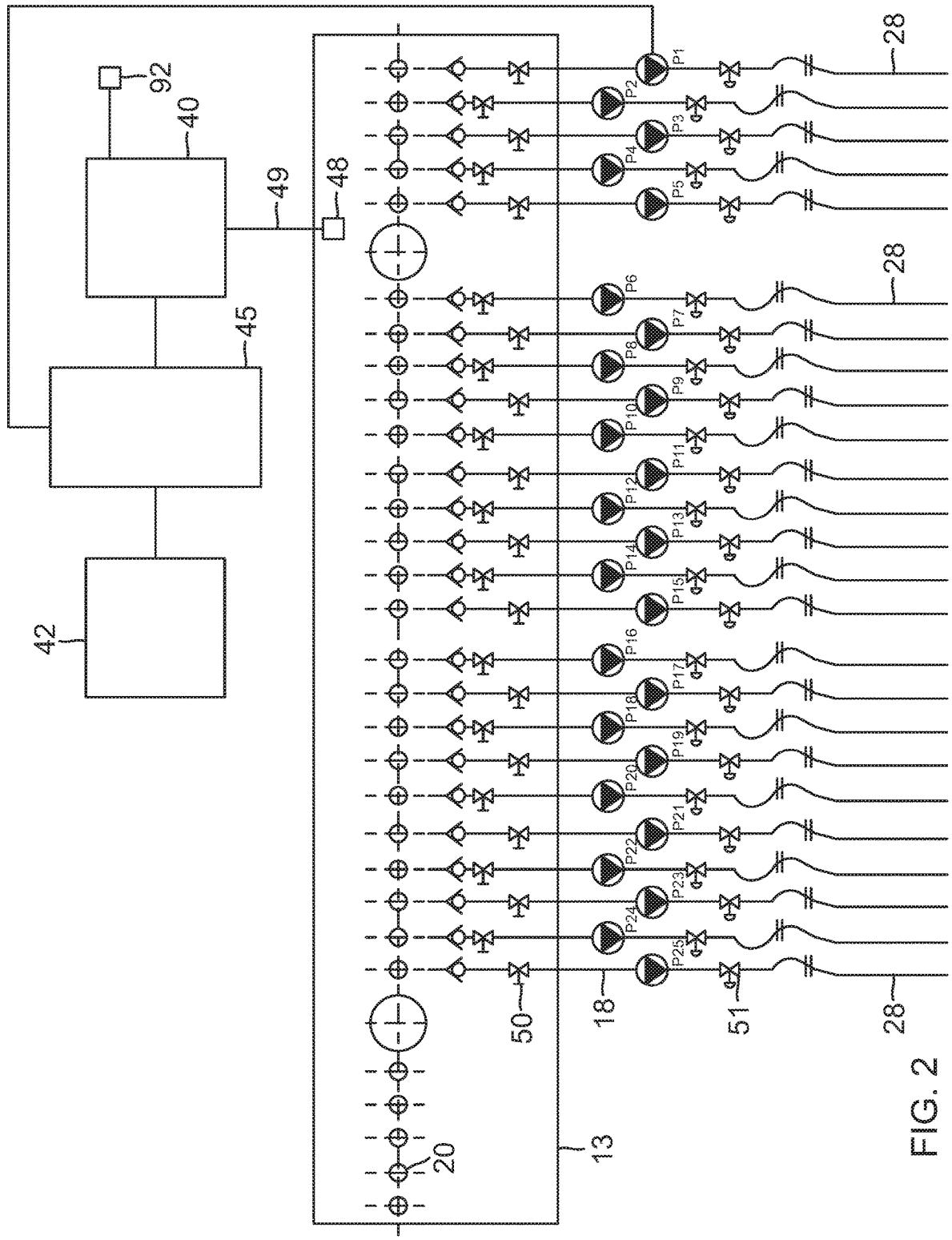
FIG. 2 is a schematic view of an embodiment of the autonomous fueling system of the present invention.

As shown schematically in FIG. 2 a plurality of fuel pumps P1-P 25 are attached at their intakes to some, but not necessarily all, of the fuel intake lines 18. The pumps P1-P25 are mounted on the support frame 15, and in one embodiment of the present invention, are preferably enclosed within protective cabinets 25, as shown in FIG. 1, to protect the individual pumps from potential collision and other physical hazards at an operational site, such as a fracking site. As further shown schematically in FIG. 2 some, or potentially all, of the pumps P1-P25 are attached to fuel hoses, of which fuel hoses 28 are examples. As further shown in FIG. 5 the other end of the fuel hoses 28 are individually connected to specialized refueling caps 30 which further comprise an aspect of the present invention. The refueling caps 30 have a mating configuration adapted to be mounted on most conventional machinery fuel tanks such as saddle tank 32 shown in FIG. 5. A fuel level sensor 35 is coupled to the refueling cap 30 and positioned within the saddle tank 32. In one presently preferred embodiment the fuel level sensor 35 is further electrically connected to a wireless transmitter 38 disposed proximate the saddle tank 32.

In operation, the fuel level of saddle tanks 32 that are fitted with refueling caps 30 and connected to the main fuel tank 13 by fuel hoses 28 are monitored through the fuel level sensors 35 in wireless communication with a controller 40 via the wireless transmitters 38. When the fuel level of any individual saddle tank 32 reaches a predetermined lower level, more described fully below, the controller 40 then causes activation of the pump fluidically coupled to that specific saddle tank 32 (one of P1-P25) by one of the fuel hoses 28. In one preferred embodiment of the present invention the pumps P1-P25 are powered by a generator 42 selectively coupled to the pumps P1-P25 through a bank of switches 45 responsive to activation signals from the controller 40.

Applicants have determined use of individual fuel pumps P1-P25, each fuel pump individually connected to the main fuel tank 13 and further connected to a single saddle tank 32 to be supplied with fuel, provides a more reliable and robust fueling system for multiple saddle tanks 32 in comparison to systems employing just one, or only a couple, of pumps connected to a main fuel reservoir and supplying multiple saddle tanks 32 with fuel through a manifold structure equipped with a plurality of powered solenoids to control individual fuel flows as described in U.S. Pat. No. 9,346,662. Applicants have determined the use of so few pumps creates a "point-of-failure" condition where the loss of even one pump can cause a failure to refuel multiple saddle tanks, and hence cause the cessation of operation for multiple machines likely essential to continued operations at projects such as a fracking operation. By using individual pumps P1-P25 for each saddle tank 32, and by providing more pumps than anticipated to be required at a normal operation, any single defective pump can be rapidly substituted or replaced before the single saddle tank runs out of fuel. Applicants have further determined use of multiple fuel intake lines 18 avoids another potential point-of-failure arising from the use of only one or two fuel intake lines in combination with a manifold. Use of only a few input lines can again cause a failure to refuel multiple saddle tanks if a single fuel intake line becomes impaired either through external damage or development of a blockage, resulting in the same cessation problems discussed above. By using multiple input lines, such as input line 18, in the present invention, and by providing more input lines than anticipated to be placed in use, it is possible to simply and rapidly switch to another input line and pump if any one fuel input line 18 becomes clogged or otherwise impaired. The individual features of various embodiments of the present invention will now be discussed in greater detail below.

Referring back to FIG. 1, the main fuel tank 13 is, in one preferred embodiment of the present invention, a Flameshield® type tank having a capacity to store about 13,500 gallons of fuel. Such tanks are commercial products available from a number of sources. Typically, they are double walled and fire resistant for periods of time up to 2 hours at temperatures of up to 2,000 degrees Fahrenheit. In one preferred embodiment the main fuel tank 13 is further provided with a fill line 46 to afford initial filling of the main fuel tank after transport to an operational site while empty, or to afford re-filling of the main tank 13 if demands exceed a substantial portion of the fuel supply within the main tank 13. This fill line 46 may, but need not necessarily, be a 3-inch line terminating in a standard commercial cam-lock coupling. Preferably the fill line 46 can accommodate fluid flow rates of up to approximately 250 gallons per minute fluid flow. The fill line 46 is further supplied with a shutoff valve (not shown). One preferred embodiment of the present invention further includes a dual stage filter 47 to remove potential impurities in the fuel being supplied to the main fuel tank. Applicants have found that in some instances some fuels, such as diesel fuel available at an operational site such as a fracking site, may be contaminated with various impurities including some forms of algae. Applicants have determined that substantially all contaminants capable of incapacitating either the autonomous fueling system of the present invention or machinery being supplied fuel by the present invention can be filtered out if the filter allows passage of materials no more than approximately 10 microns in size. In a preferred embodiment of the present invention this 10 micron fuel filter still accommodates about 250 gallons per minute fluid flow.

As shown schematically in FIG. 2, the main fuel tank 13 is further provided, in one preferred embodiment of the present invention, with a sensor 48 for sensing the quantity fuel remaining in the main fuel tank 13. This sensor is preferably, but not necessarily, connected to the controller 40 by an electrical connection 49. The sensor may alternatively be connected to a wireless transmitter providing a wireless signal to the controller 40. In operation, when the fuel level in the main fuel tank 13 reaches a predetermined level the controller 40 may be configured to provide an alarm or other notice indicating refueling of the main fuel tank is advisable or necessary. In alternative embodiments of the present invention, the main fuel tank 13 may further be supplied with a supplemental or "nurse" tank (not shown) to increase the supply of fuel available to machinery fueled by the various saddle tanks 32. Such supplemental tanks are commercially available and well known in the relevant art.

The individual fuel intake lines, such as line 18 shown in FIG. 1, that are attached to the main fuel tank 13 are, in one preferred embodiment of the present invention, three quarter inch steel lines. Couplings, such as coupling 20, between the individual fuel intake lines 18 and the main fuel tank 13 may be standard, conventional couplings 20 afforded with Flameshield® tanks. The fuel intake lines 18 may further be advantageously attached to the side of the main fuel tank 13 to afford a more ruggedized structure and dampen vibration. In a preferred embodiment the individual fuel intake lines 18 terminate in a quick disconnect type coupling connecting the end of the fuel intake lines 18 to individual ones of the pumps P1-P25. Quick disconnect type couplings are known in the art and are characterized by a spring biased valve assembly that creates a seal when one end of the quick disconnect coupling is detached from another end of the coupling. As shown schematically in FIG. 2, manual shutoff valves such as shutoff valve 50 are further attached to each of the fuel intake lines 18 upstream of couplings to pumps P1-P25. These shutoff valves 50 facilitate prompt replacement of any individual pump P1-P25 that may become subject to failure and require replacement, and further avoid or minimize potential spillage of fuel from the fuel intake lines 18 during replacement of an individual pump P1-P25.

In one embodiment of the present invention the pumps P1-P25 can supply at least approximately 5-10 gallons per minute of fluid flow and are further able to pump fluid a distance of up to 500 feet. Preferably, though not necessarily, the pumps P1-P25 are constructed of brass and include a brass impeller to reduce the potential for generating sparks if any of the workings of the pump fails. Such pumps are commercially available. Attachment of the pumps P1-P25 to the frame 15 may be further facilitated by use of flexible anti-vibration mounts (not shown).

As shown schematically in FIG. 2 the pumps P1-P25 are also preferably, although not necessarily, connected individually to manual shutoff valves, such as shutoff valve 51, at their output ends. Not all pumps P1-P25 need be used at any specific operational site. The number in use being determined by the number of fuel driven machinery in use at the site. A quick disconnect coupler is provided down stream of the shutoff valves 51 for coupling the output of the pumps P-P25 to the fuel hoses 28. The fuel hoses 18 are preferably constructed of materials resistant to rupture if a vehicle inadvertently drives over one of the fuel hoses 18. The fuel hoses 28 are also conventional commercially available steel beaded rubber-type hoses, preferably though not necessarily, of three quarter to one-inch diameter. In one preferred embodiment multiple hose lengths of fifty feet or one hundred feet, and capable of being interconnected to afford longer lengths are utilized. Use of these lengths for the fuel hoses 28 advantageously allow for fluidic coupling between the main fuel tank 13 and the saddle tanks 32 located up to four hundred feet away in multiples of one hundred or one hundred fifty feet length. Thus, fuel hose 28 lengths of one hundred feet, one hundred fifty feet, two hundred, two hundred fifty feet, three hundred, three hundred fifty feet and four hundred feet can be achieved without unnecessary segments of the fuel hose 28 (potentially some fifty feet or more in length) residing proximate either the main fuel tank 13 or the saddle tank 32.

Figure 3:
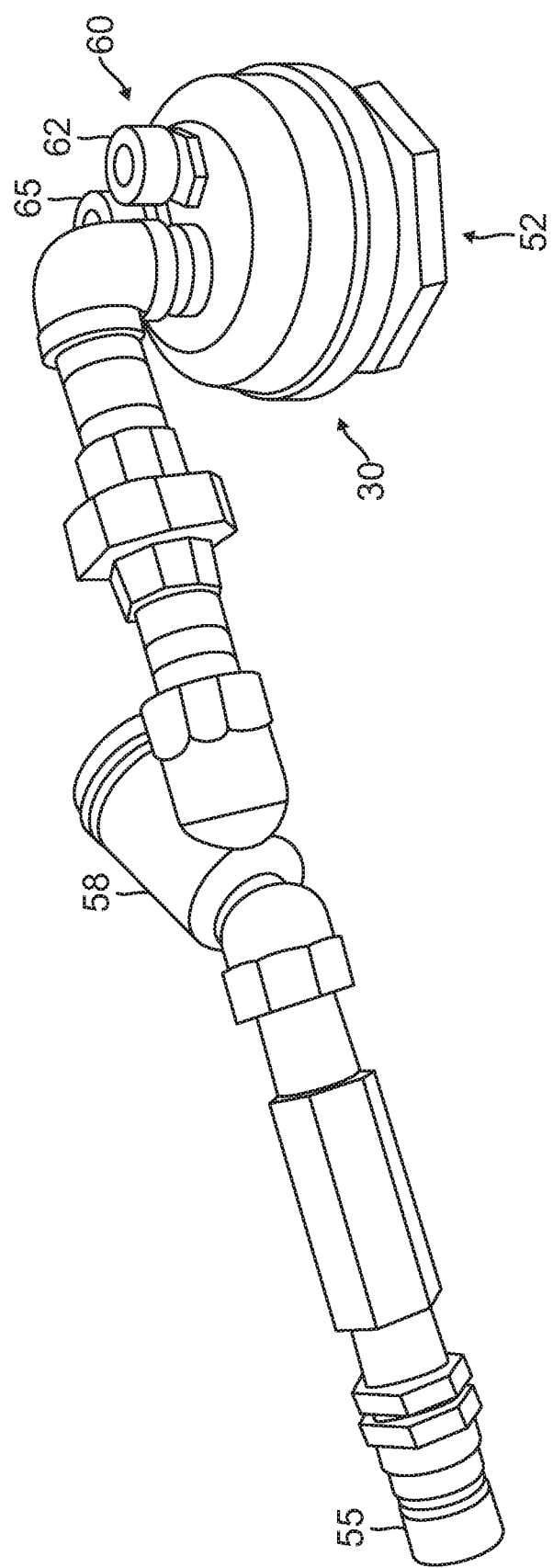
FIG. 3 is perspective view of an embodiment of the target tank fueling cap of the present invention.

In FIG. 3 one preferred embodiment of the refueling cap 30 is shown. The refueling cap 30 is configured at one end 52 so as to mate with the conventional and generally standardized fueling opening of a conventional saddle tank 32. Another end of the refueling cap is preferably, though not necessarily, provided with a quick disconnect type coupler 55 for mating with an end of the fuel hose 28. By use of a quick disconnect coupler 55, of the type generally described above, the saddle tank 32 is at least partially protected from the introduction of contaminants when the refueling cap 30 is disconnected from a fuel hose 28. A pressure valve 58 is disposed between the quick disconnect coupler 55 and the refueling cap 30. This pressure valve is configured to prevent the flow of fluid through the cap 30 in the absence of a predetermined level of fluid pressure directed into the refueling cap 30. This pressure valve 58 advantageously prevents potential siphoning of fuel out of or into the saddle tank 32, thereby preventing inadvertent and unintentional draining of the saddle tank 32 when, for example, a portion of the fuel hose 28 has been ruptured at an operational site or when environmental conditions at the operational site cause the ambient pressure within the main fuel tank 13 to be lower than the internal pressure within the saddle tank 32. In one preferred embodiment of the present invention the pressure valve 58 only opens in response to an input fluid pressure of at least approximately ten pounds of pressure per square inch. Such pressure valves are commercially available from a variety of sources.

In one preferred embodiment of the present invention the refueling cap 30 is further provided with a vent 60 equipped with a sensing switch 62 capable of sensing fluid flow through the sensing switch 62. The vent permits the outflow of air from the saddle tank 32 as the saddle tank 32 is filled with fuel. The sensing switch 62 advantageously avoids potential overfilling of the saddle tank 28 by detecting fluid flow though the sensing switch 62, thus avoiding potential fuel spillage. Such spillage can be highly hazardous in an operational site such as a fracking site. The sensing switch 62 is electrically connected to the wireless transmitter 38, which is also connected to the fuel level sensor 35. In operation, upon detection of fluid flow by the sensing switch 62 a signal is wirelessly transmitted to the controller 40 to immediately discontinue pumping operation of the individual one of the fuel pumps P1-P25 coupled to that particular saddle tank 32. Fluid flow sensing valves such as sensing switch 62 are also conventional and commercially available products. One such type of sensing valve is known as a "float valve" in which an electrical connection is created or interrupted by a float ball when fluid passes through the valve.

Figure 5:
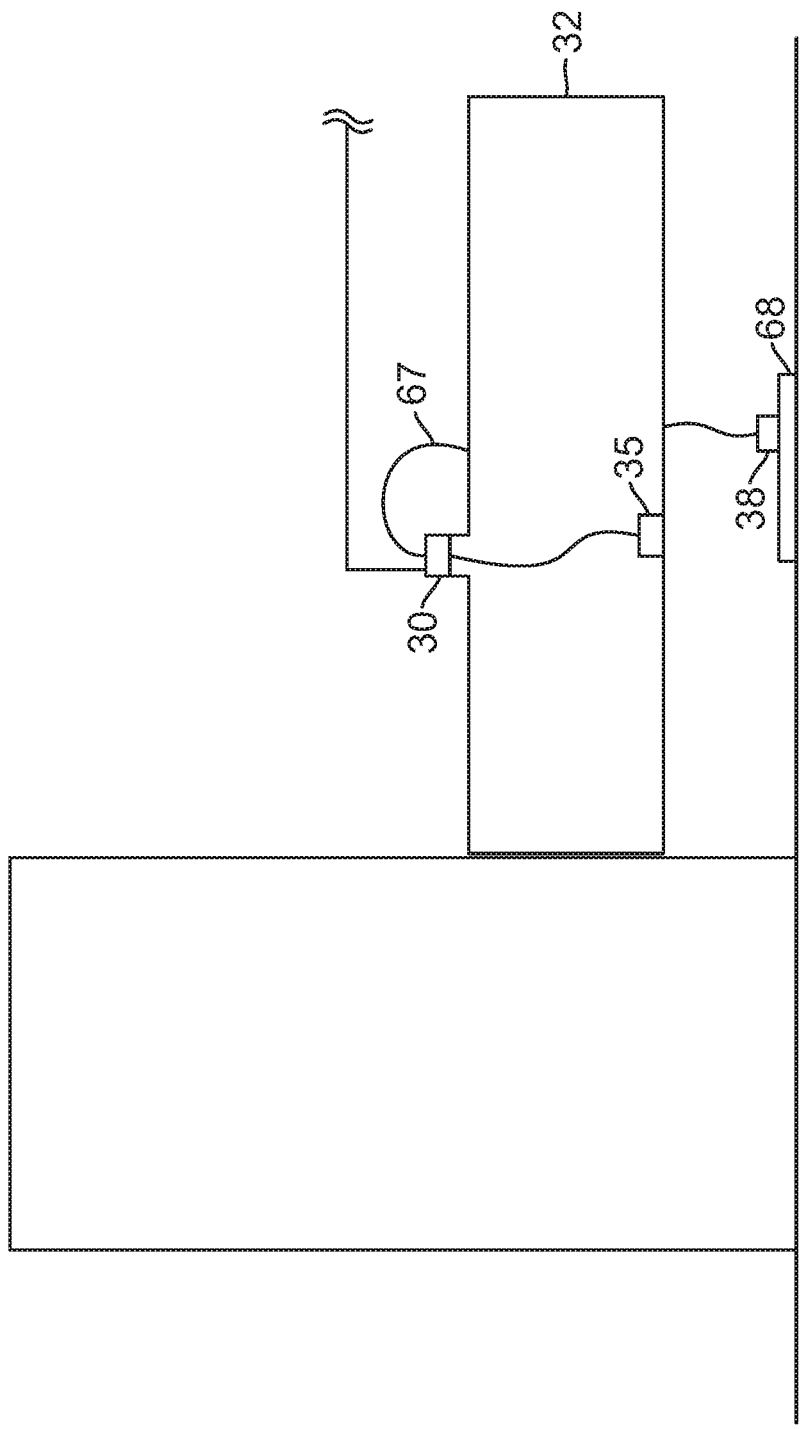
FIG. 5 is a sectional side view of a target tank equipped with an embodiment of the fueling cap of the present invention.

The refueling cap 30 also includes a sealed electrical pass-through 65 to accommodate passage of an insulated electrical wire 67 connecting the fuel level sensor 35 disposed within the saddle tanks 32 to the wireless transmitter 38, as further shown in FIG. 5. In one preferred embodiment of the present invention the fuel level sensor 35 is a battery powered pressure sensor having dimensions small enough to fit through the conventional fueling port of a standard saddle tank. Such sensors are commercially available from various sources. In use, the sensor 35 is placed at the bottom of the saddle tank 32. The sensor 35 then provides a signal indicative of the pressure being exerted upon the sensor by the height of fluidic fuel residing in the saddle tank 32. Preferably the sensor 35 can detect pressure level changes corresponding to a one quarter inch change in the height of the fuel residing in the saddle tank 32. This height corresponds to a quantity of fuel residing in the saddle tank 32 as further discussed below in connection with the methods of the present invention. The wireless transmitter 38 is a conventional battery powered radio transmitter in either continuous or intermittent radio contact with the controller 40 and outputs a digital signal indicative of the pressure reading detected by sensor 35. The wireless transmitter 38 preferably has a range exceeding the distance from the saddle tank 32 to the controller 40. In one preferred embodiment of the present invention the wireless transmitter has a range of at least one mile. Such transmitters are generally commercially available. In one preferred embodiment of the present invention the wireless transmitter 38 is further mounted onto a metal plate 68 having at least about one-square foot area. In use the wireless transmitter and plate 68 are placed on the ground, usually underneath the saddle tank 32. Applicants have determined this configuration of the wireless transmitter 38 and accompanying plate 68 advantageously reduces the risk of dislodgement or displacement of the wireless transmitter 38 from proximity to the saddle tank 32 and refueling cap 30, typically found to occur by accident on the part of personnel working in an operational area such as a frack site.

As shown in FIG. 1 the controller 40 is preferably disposed in a cabinet 70 mounted on the frame 15 proximate one end of the main fuel tank 13. In one embodiment of the present invention this cabinet 70 includes a generally rain-proof structure and is temperature controlled to avoid overheating at operational sites located in extreme temperature environments. Frack sites situated in the southern portion of the American Midwest, for example, can reach or even exceed 120 degrees at some times of the year. The cabinet 70 is preferably NEMA 12 compliant. Such cabinets are conventional, and commercially available from a variety of sources. A similar cabinet (not shown) may be mounted to the frame 15 on the opposite end 71 of the main fuel tank 13 to house the bank of switches 45, schematically depicted in FIG. 2, that selectively supplies power from the generator 42 to individual members of the pumps P1-P25. The controller 40 may comprise a conventional computer or may be comprised of Programmable Logic Controller, or both. In operation, the controller 40 monitors the operation of the pumps P1-P25 and provides a notice or alarm if operation of the pumps P1-P25 deviates from predetermined modes of operation. One aspect of the present invention concerns how the controller 40 operates the pumps P1-P 25. In accordance with this aspect of the invention the controller 40 causes activation of a one of the pumps P1-P25 when the fuel level in the saddle tank 32 associated with that particular pump is found to have been reduced to a predetermined level. In one embodiment this level is no less than approximately 40% of the maximum fuel capacity of the saddle tank 32. The controller 40 further causes deactivation of the pump when the fuel level in the saddle tank 32 associated with that particular pump is found to have risen to a predetermined level. In one embodiment this level is no more than approximately 60% of the maximum fuel capacity of the saddle tank 32.

As noted earlier, the controller 40 also causes deactivation of the one of pumps P1-P25 associated with a particular saddle tank 32 if a signal is received from the wireless transmitter 38 coupled to that saddle tank 32 indicating a fluid flow through the sensor 62 disposed within the vent 60 on the refueling cap 30 attached to that particular saddle tank 32. This structure, including the fluid flow sensor 62 and the of operation of the controller 40 in accordance with the present invention to shut down the pump when a signal is received from the wireless transmitter 38 indicative of fluid flow through flow sensor 62, is intended as a safety backup in case the fuel level sensor 35 is providing an inaccurate reading or in case signals from the fuel level sensor 35 have been misinterpreted by the controller 40. In accordance with this aspect of the present invention pertaining to when refueling is initiated, applicants have determined that by initiating refueling of a saddle tank 32 whenever the saddle tank 32 is reduced to no less than a minimum fuel quantity of approximately 40% of the maximum fuel capacity, then if the pump P1-P25 fluidically coupled to that saddle tank 32 fails, of some other casualty has occurred preventing refueling of that particular saddle tank 32, then there is sufficient time to replace that pump P1-P25 or repair the other casualty before the machinery fueled by that target 32 ceases operation through exhaustion of its on-board fuel supply. Applicants have further determined cessation of refueling when the saddle tank 32 has been filled to approximately 60% of its maximum capacity advantageously avoids the risk of overfilling the saddle tank 32 and causing even minor fuel spillage before activation of the fluid flow sensing switch 62. Spilt fuel, either diesel or gasoline, represents a substantial fire hazard at many operational venues, including active frack sites.

Applicants have further determined that for an alternate embodiment of the present invention refueling should commence when a saddle tank 32 has been depleted to no less than approximately ⅔ of its maximum fuel capacity and then refueled to no more than 20% of its maximum fuel capacity. This embodiment of the method of the present invention provides additional time to repair any failure in the refueling process (e.g. pump failure or casualty to fluidically coupled fueling system) while still ensuring overfilling of the saddle tank 32 by cessation of refueling when the saddle tank 32 is no more than approximately 90% full.

Operation of the controller 40 to both start and stop refueling of a saddle tank 32 at predetermined levels further benefits an additional aspect of the present invention. This aspect of the present invention concerns having the controller 40 record over time certain aspects of the operation of the pumps P1-P25. Both the interval between the active pumping operation of individual members of the pumps P1-P25 and the duration of operation of individual members of pumps P1-P25 are recorded, averaged and monitored on a constant basis.

Figure 4:
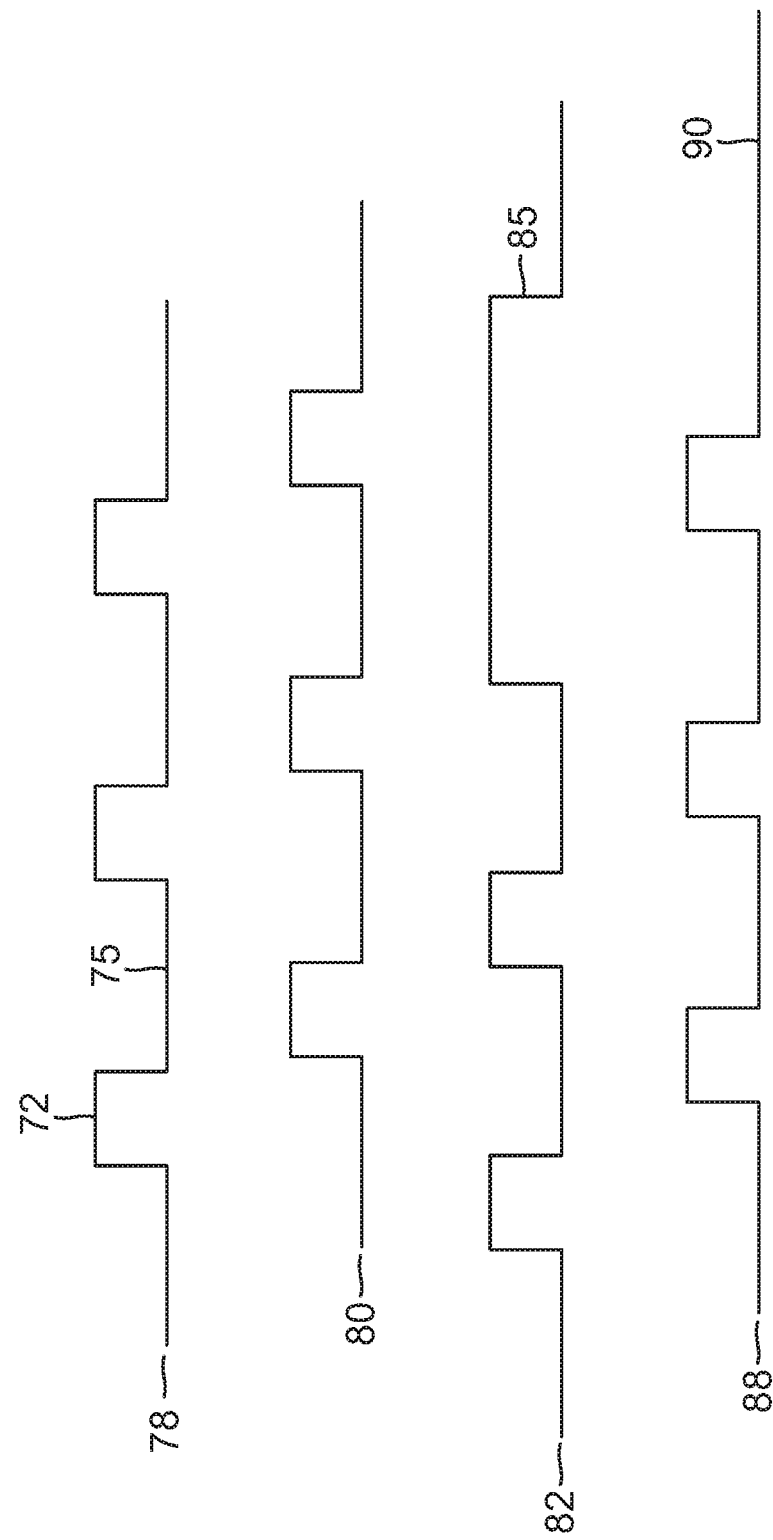
FIG. 4 is a graph of the output of data collected by a controller of the present invention.

Graphically this information is depicted in FIG. 4. As illustrated in FIG. 4 the operation of individual members of pumps P1-P25 may be graphically depicted as a square curve with the high squares, such as square 72, indicating when a particular member of pumps P1-P25 is actively pumping and the flat regions, such as flat region 75, indicating when a particular member of pumps P1-P25 is inactive. Given this representation, the plot 78 and the plot 80 represent normal, periodically repeated operation of the pumps to which plots 78 and 80 correspond. The plot 82, however, is an indicative of a condition where overfilling of a particular saddle tank 32 has occurred, or is about to occur, as shown by an extended high signal 85 in plot 82 indicative of continuing operation of a particular member of pumps P1-P25 longer than an average interval of operation. Alternatively, plot 88 is indicative of a failure of the particular one of pumps P1-P25 to operate, as shown by an extended low signal 90 in plot 88.

Computationally, controller 40 can be programmed to record and compute an average for the duration of pumping activity by pumps P1-P25 and similarly record and compute an average of the interval between pumping activity by pumps P1-P25. A first signal may then be sent by controller 40 if the duration of a pumping activity by a particular member of pumps P1-P25 exceeds a predetermined limit. In one preferred embodiment of the present invention a first signal is sent if the duration of pumping exceeds approximately 150% of an average of the duration of pumping by that particular member of pumps P1-P25. In accordance with this aspect of the present invention, extremely hazardous conditions such as overfilling of a saddle tank 32 because of failure of a fuel level sensor 35 and, potentially, failure of an associated fluid flow sensing switch 62 can be promptly noted and remedied.

Controller 40 may further be configured to generate a second signal if the interval between pumping activities by a particular member of pumps P1-P25 exceeds another predetermined limit. In one preferred embodiment of the present invention, a second signal may be sent by controller 40 if the interval between pumping activity by a particular member of pumps P1-P25 exceeds approximately 120% of an average of the interval between pumping activity by that particular member of pumps P1-P25. If refueling is initiated when a saddle tank 32 reaches no less than 40% of its maximum capacity and if an alarm is sounded when an interval between refuelings exceeds 120% then the saddle tank should still have at least 35% of its maximum capacity (about ⅓ full) when an alarm indicative of equipment failure or damage is generated. In an alternative embodiment of the method of the present invention, whenever the saddle tank is depleted to approximately ⅔ of its maximum capacity, the amount of time available to repair any pumping failure is even greater. Thus, in accordance with this aspect of the present invention, the failure of one particular member of pumps P1-P25 and be promptly detected and replaced before the machinery fueled by a saddle tank 32 fluidically coupled to a failed member of pumps P1-P25 ceases operation because it has run out of fuel.

In an alternative embodiment of the present invention, duration of pumping by an individual member of pumps P1-P25 can be further correlated to the actual quantity of fuel pumped into a saddle tank 32 that is fluidically coupled to that particular one of pumps P1-P25. This correlation can be achieved by multiplying the duration of pumping with the known flow rate of the pumps P1-P25 to determine the quantity of fuel pumped into a particular saddle tank 32. Alternatively, or additionally, the quantity of fuel supplied to a particular saddle tank 32 can be determined by readings from the main fuel tank fluid sensor 48. A first reading can be taken at the start of active pumping to the particular saddle tank 32 and a second reading can be taken at the end of active pumping to that saddle tank 32. The difference in these two readings is indicative of the amount of fuel pumped out of the main fuel tank 13 which indicates the quantity of fuel pumped into the particular saddle tank 32. Of course, this latter method only works if no other members of the pumps P1-P25 are active at the same time.

The controller 40 may be further programmed to report other conditions requiring prompt attention. For example, the controller 40 may generate a wireless signal to a remote supervisor when a signal from the main fuel tank fluid sensor 48 indicates the remaining fuel within the main fuel tank 13 has reached a predetermined minimum level. Additionally, the controller may generate signals indicative of the failure of any of the fuel level sensors 35 or loss of signal from any of the wireless transmitters 38. In one embodiment of the present invention the quantify of fuel in the saddle tanks 32 is continuously or periodically reported to a supervisory location remote from the autonomous fueling system 10 of the present invention. The controller 40 may be configured to wirelessly transmit data, signals and alarms to a remote supervisory location. Alternatively, a separate wireless transmitter 92 may be connected to the controller 40 as schematically illustrated in FIG. 2 to accommodate wireless transmission of data from the controller 40 to a supervisory location remote from the fueling system 10. In one embodiment, wireless communications are preferably effectuated using encrypted and conventional ethernet communication protocols. Encryption is advantageous to minimize the potential for hostile actors to hack the controller 40 or to otherwise maliciously hack into the system communicating with the controller 40. Transmission of data, alarm signals and status information from the controller to a supervisory location remote from the fueling system 10 effectively removes the necessity of having an operator or supervisor proximate the fueling system 10 during operation. Thus, an operator or supervisor of the fueling system 10 need not be in the operational venue, such as a frack site, while potentially operations are active.

The present invention provides a method and apparatus for autonomous fueling of multiple machines at an operational site such as a fracking site. The invention affords a continuous 24/7 fueling/refueling cycle with uninterrupted service, including during deliveries of additional fuel to the main fuel tank 13 itself. This invention also reduces various single fault "point-of-failure" weaknesses found in prior art systems. Further reliability and continuity of operation are afforded through the methods of the present invention, including real time fuel level and fuel flow monitoring for both source and individual recipient saddle tanks 32. The invention also removes the operator from the site, making operations substantially safer. The current invention also affords rapid and easy customization of the autonomous fueling apparatus and easy replacement of failed or damaged components. Finally, the current invention takes up a far less space on the frack site than prior art systems, which results in less congestion and greater safety for fracking operations overall.

Having described and illustrated the present invention in various preferred embodiments, it should be readily apparent to those skilled in the relevant arts that the present invention can be modified in arrangement and detail to provide numerous other embodiments that do not depart from the spirit and scope of this invention. Accordingly, all equivalent relationships to those illustrated in the drawings and described in the specification above are intended to be encompassed within the scope of the present invention, as set forth in the claims below and equivalents thereof.

It is to be further understood that the phraseology and terminology employed herein are for the purposes of description only and should not be regarded as limiting the scope of the present invention. Therefore, the foregoing description of the present invention is to be considered as illustrative only of the principles of the present invention. Further, since numerous modifications, changes and alternative embodiments will occur to those skilled in the art, the present invention is not to be limited to the structures, elements, construction and operation shown and described above, but solely by the claims set forth below and equivalents thereof

What is claimed is:

1. An autonomous fueling system for fueling multiple target fuel tanks, comprising:
    a main fuel tank;
    a support frame adapted to support the main fuel tank upon the ground;
    a fuel input to said main fuel tank and a dual stage filter disposed between the fuel input and said main fuel tank capable of filtering any contaminants larger than approximately 10 microns while permitting approximately 250 gallons per minute fuel flow;
    a plurality of fuel intake lines projecting into the main fuel tank;
    a plurality of fuel pumps having input ends and output ends, at least some of said fuel pumps having an input end attached to at least some of the plurality of fuel intake lines;
    a plurality of fuel hoses having one end attached to the output end of at least some of said fuel pumps;
    a fuel cap adapted for mounting on at least some of said multiple target fuel tanks, said fuel cap further comprising a fluid flow valve for preventing fluid flow through the fuel cap absent sufficient input pressure, a self-powered fuel level sensor generating a first signal indicative of a fuel level within a target fuel tank, a gas vent and a fluid flow sensor attached to the gas vent generating a second signal indicative of a fluid flow through the sensor;
    a wireless transmitter, electrically connected to the fuel level sensor and the fluid flow sensor, configured to generate a first wireless signal indicative of an output from said fuel level sensor and to generate a second wireless signal indicative of an output from said fluid flow sensor;
    a power supply, electrically connected to at least some of said fuel pumps, selectively powering said fuel pumps; and
    a main controller responsive to the wireless signal from said wireless transmitter to cause activation of a fuel pump connected to a target fuel tank when said target fuel tank is reduced to a first fuel quantity and to deactivate the fuel pump connected to a target fuel tank when said target fuel tank is refueled to a second fuel quantity, said controller further recording an interval between target fuel tank refuelings and generating a first alarm signal when an interval between refuelings of a target tank exceeds a predetermined time longer than an average of said interval between refuelings.

2. The autonomous fueling system of claim 1 wherein said main controller records a duration of target fuel tank refuelings and generates a second alarm signal when a duration of a refueling of a target tank exceeds a predetermined time longer than an average of said duration of refuelings.

3. The autonomous fueling system of claim 1 wherein said main controller activates a fuel pump connected to a target fuel tank when said target fuel tank is at no less than approximately ⅓ of a maximum capacity of said target fuel tank and deactivates a fuel pump connected to a target fuel tank when said target fuel tank is at no more than approximately ⅔ of a maximum capacity of said target fuel tank.

4. The autonomous fueling system of claim 3 wherein said main controller activates a fuel pump connected to a target fuel tank when said target fuel tank is at no less than approximately 40% of a maximum capacity of said target fuel tank and deactivates a fuel pump connected to a target fuel tank when said target fuel tank is at no more than approximately 60% of a maximum capacity of said target fuel tank.

5. The autonomous fueling system of claim 1 wherein said main controller activates a fuel pump connected to a target fuel tank when said target fuel tank is at no less than approximately ⅔ of a maximum capacity of said target fuel tank and deactivates a fuel pump connected to a target fuel tank when said target fuel tank is refueled approximately 20% of a maximum capacity of said target fuel tank.

6. The autonomous fueling system of claim 1 wherein said main controller deactivates a fuel pump connected to a target fuel tank in response to a wireless signal indicative of a signal from said fluid flow sensor.

* * * * *